(12) United States Patent
Zeng et al.

(10) Patent No.: US 6,505,299 B1
(45) Date of Patent: Jan. 7, 2003

(54) DIGITAL IMAGE SCRAMBLING FOR IMAGE CODING SYSTEMS

(75) Inventors: Wenjun Zeng, Vancouver, WA (US); Shaw-Min Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/260,193

(22) Filed: Mar. 1, 1999

(51) Int. Cl.⁷ .............................................. G06F 01/24
(52) U.S. Cl. ..................... 713/160; 713/180; 713/200; 713/201
(58) Field of Search .................. 713/160, 189, 713/200, 201

(56) References Cited

U.S. PATENT DOCUMENTS

| | | | |
|---|---|---|---|
| 4,100,374 A | | 7/1978 | Jayant et al. ............. 179/1.5 S |
| 4,852,166 A | | 7/1989 | Masson ........................ 380/36 |
| 4,964,162 A | | 10/1990 | McAdam et al. ............. 380/14 |
| 5,268,961 A | | 12/1993 | Ng .............................. 380/19 |
| 5,321,748 A | | 6/1994 | Zeidler et al. ................ 380/14 |
| 5,546,461 A | * | 8/1996 | Ibaraki et al. .............. 380/201 |
| 5,621,799 A | | 4/1997 | Katta et al. .................... 380/48 |
| 5,684,876 A | | 11/1997 | Pinder et al. ................ 380/37 |
| 5,710,834 A | * | 1/1998 | Rhoads ....................... 380/202 |
| 5,764,770 A | * | 6/1998 | Schipper et al. ............ 380/200 |
| 5,815,572 A | | 9/1998 | Hobbs ............................ 380/10 |
| 5,822,436 A | * | 10/1998 | Rhoads ........................ 380/54 |
| 5,832,119 A | * | 11/1998 | Rhoads ........................ 382/191 |

OTHER PUBLICATIONS

B. Macq and J. Quisquater, "Digital images multiresolution encryption," *J. Interactive Multimedia Assoc. Intell. Property Proj.*, vol. 1, No. 1, pp. 179–186, Jan., 1994.

B. Macq and J. Quisquater, "Cryptology for digital TV broadcasting," *In Proc. Of the IEEE*, vol. 83(6), pp. 944–957, 1995.

L. Tang, "Methods for encrypting and decrypting MPEG video data efficiently," *Proc. The Fourth ACM International Multimedia Conference (ACM Multimedia '96 )*, pp. 219–229, 1996.

I. Agi and L. Gong "An Empirical Study of Secure MPEG Video Transmissions," *The Internet Society Symposium on Network and Distributed System Security*, Feb., 1996.

* cited by examiner

*Primary Examiner*—Thomas R. Peeso
(74) *Attorney, Agent, or Firm*—Marger Johnson & McCollom, P.C.

(57) ABSTRACT

Methods and apparatus for encryption and decryption of digital images are disclosed. A preferred embodiment operates on an image frame after that frame has undergone a space-frequency transform operation, such as a block DCT or wavelet transform, and before the frame is passed to a bitstream coder for entropy coding. The transform coefficient map is subjected to one or more encryption operations that render a subsequently decoded (but not decrypted) image incomprehensible. These operations are designed to operate with low computational overhead and with only minor effects on compressed bit rate. They also allow secure transcoding at intermediate routers of the transmission channels without the cryptographic key.

In one operation, the sign bits of transform coefficients are scrambled. In another operation, two dimensional blocks of coefficients from a common subband are shuffled and/or rotated to pseudorandom locations and orientations. In yet another operation, coefficients occupying a common "subband", but taken from different DCT blocks, are shuffled. Still another operation shuffles motion vectors and/or scrambles sign bits for motion vector coefficients. These operations perturb the data as it will appear visually, without greatly perturbing the entropy of the data as presented to an entropy coder.

19 Claims, 10 Drawing Sheets

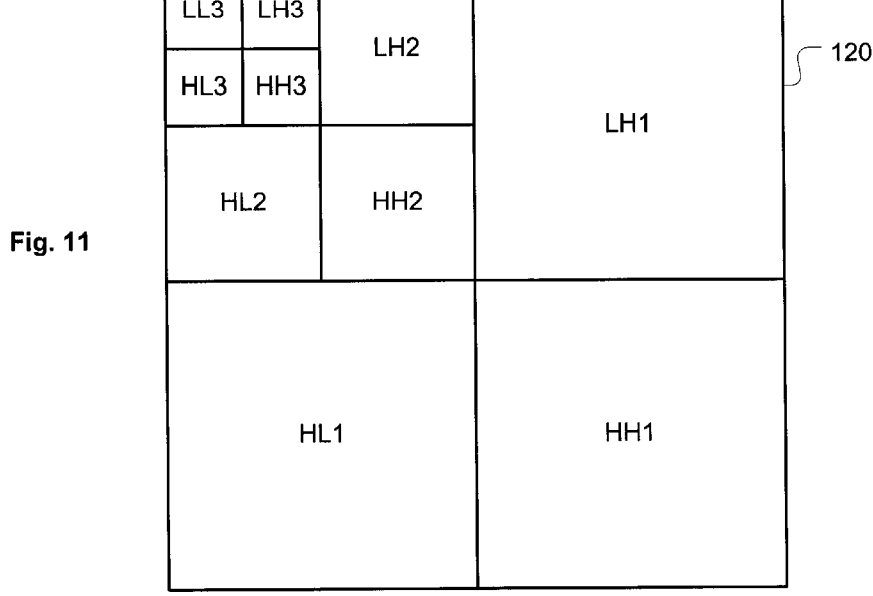
Fig. 11
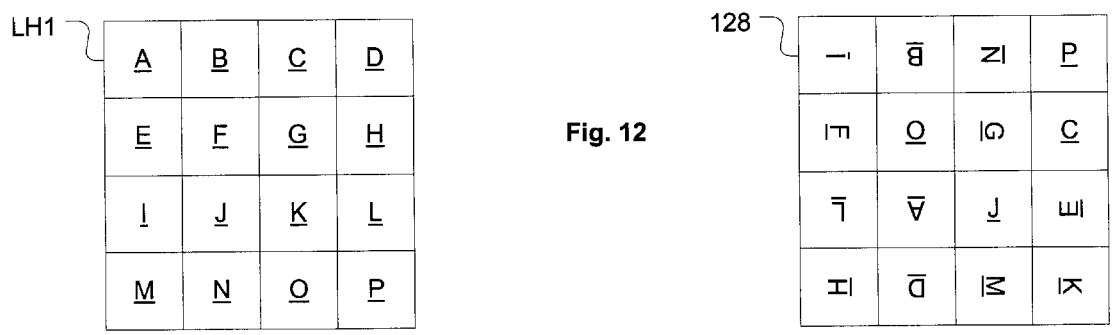
Fig. 12
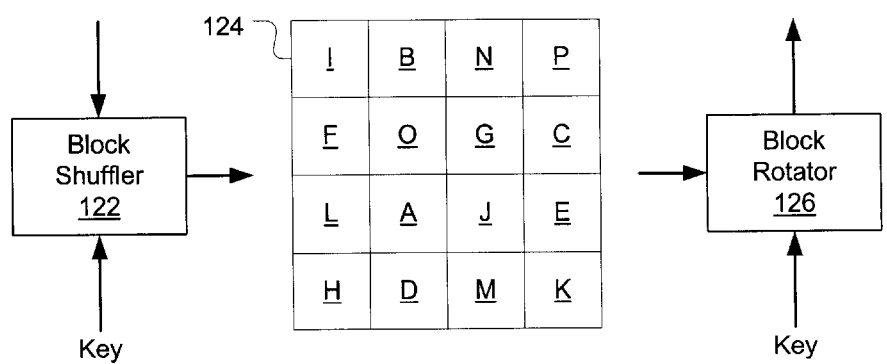

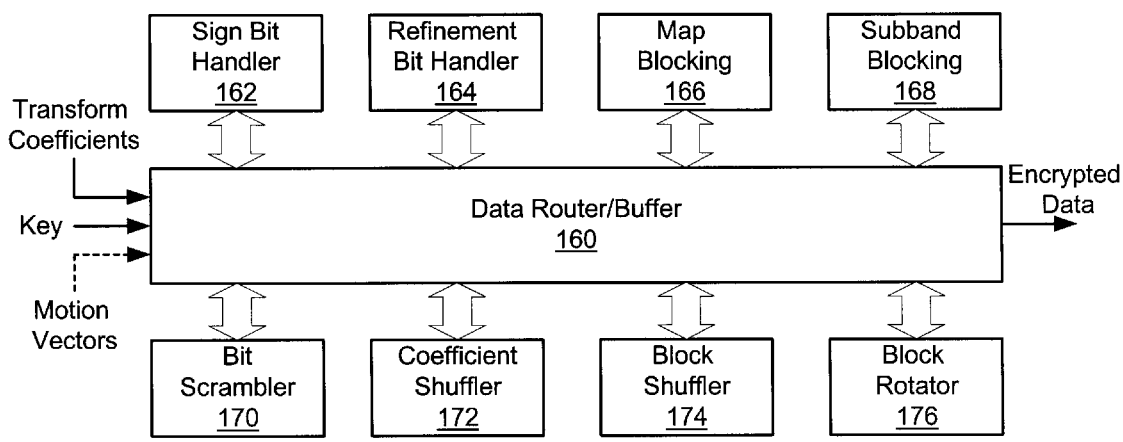
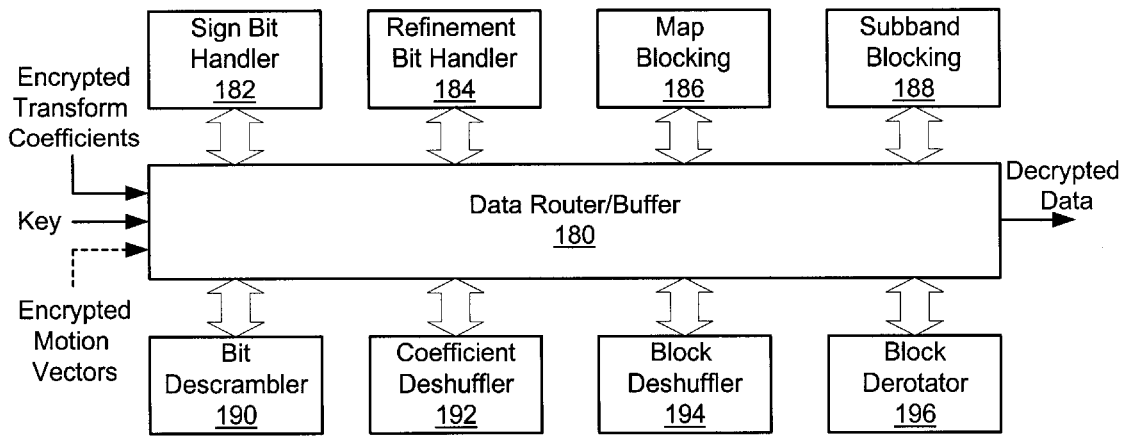

DIGITAL IMAGE SCRAMBLING FOR IMAGE CODING SYSTEMS

FIELD OF THE INVENTION

This invention pertains generally to digital imaging, and more particularly to digital image scrambling.

BACKGROUND OF THE INVENTION

Digital images, including digital video, are often communicated or distributed over non-private channels, such as satellite links, cable television networks, wireless home networks, and the Internet. Conditional access systems for private digital image/video transmission or storage are a necessity for many applications, for example, pay-TV, confidential videoconferences, confidential facsimile transmissions, and medical image transmission and storage in a database. Digital cryptography techniques must be used in conjunction with non-private channels if unauthorized parties are to be prevented from gaining access to such private imagery.

Video scramblers are commonly employed to prevent unauthorized access to image data. Several video scrambling systems rely on methods of directly distorting the visual image data such that, without descrambling, the video appears unintelligible to a viewer. For example, U.S. Pat. No. 4,100,374, issued Jul. 11, 1978, to N. Jayant and S. Kak, and entitled "Uniform permutation privacy system", describes an approach where a video signal is divided into groups of N successive video samples, and samples within a group are then permuted. U.S. Pat. No. 5,321,748, entitled "Method and apparatus for television signal scrambling using block shuffling", issued Jun. 14, 1994, to D. Zeidler and J. Griffin, describes an alternate approach where blocks of video lines and lines within a block are shuffled. In U.S. Pat. No. 5,815,572, entitled "Video scrambling", and issued Sep. 29, 1998, to G. Hobbs, the approach includes a combination of video permutation modes, including line reversal, line inversion, line permutation and block (of lines) permutation, where the combination of modes used changes as time progresses. These methods have several drawbacks, including: 1) they can severely degrade the compressibility of the images; and 2) they are vulnerable to code-breaking attacks because of the highly spatially-and temporally-correlated nature of video sequences.

In many systems for scrambling digital images, the images are first subject to compression, and then the compressed image data is treated as ordinary data and is encrypted/decrypted using traditional cryptographic algorithms such as the Digital Encryption Standard (DES). See H. Pinder and M. Palgon, "Apparatus and method for cipher stealing when encrypting MPEG transport packets," U.S. Pat. No. 5,684,876, Nov. 4, 1997; N. Katta et. al, "Scrambled transmission system," U.S. Pat. No. 5,621,799, Apr. 15, 1997. Due to the high data rate of video (even compressed video), these methods add a large amount of processing overhead to meet a real-time video delivery requirement. To reduce the amount of processing overhead, several researchers have proposed selective encryption of MPEG compressed video data. See T. Maples and G. Spanos, "Performance study of a selective encryption scheme for the security of networked, real-time video," *Proc. 4th Inter. Conf. Computer Communications and Networks*, Las Vegas, Nev. (September 1995); J. Meyer and F. Gadegast, "Security mechanisms for multimedia data with the example MPEG-1 video," http://www.cs.tuberlin.de/phade/phade/secmpeg.html (1995). For example, in selective encryption, only the entropy-coded I frames, or the entropy-coded I frames and Intra-coded blocks of predictive (P/B) frames may be encrypted. I. Agi and L. Gong showed in "An empirical study of secure MPEG video transmissions," *The Internet Society Symposium on Network and Distributed System Security* (February 1996), that in some cases the encryption of I frames alone does not provide sufficient security. These systems may also be vulnerable to possible plain text attacks that make use of the known synchronization word or End of Block symbol that are often used in compression systems to limit error propagation. To selectively encrypt some segments of the compressed data such as Intra blocks sometimes incurs additional header overhead to locate such segments (see, e.g., Meyer and Gadegast's method). In addition, this classical approach is not very secure for transcoding at intermediate routers of the transmission channel because the transcoder must be able to decrypt.

Other systems use more elaborate means to distort video images. B. Macq and J. Quisquater propose, in "Digital images multiresolution encryption", *J. Interactive Multimedia Assoc. Intell. Property Proj.*, vol. 1, no. 1, pp. 179–186 (January 1994), a three-step process for scrambling an image. The image is first transformed by a "Linear Multi-resolution Transform" (LMT) proposed by the authors. Selected rows and columns of the transformed image are then shuffled. The shuffled transform image is then subjected to an inverse LMT prior to transform and bitstream coding. A decoder reverses these steps to restore the original image. Although this method is less vulnerable to code-breaking attacks, and can provide a level of transparency (e.g., a degraded version of the original image is visible in the scrambled signal), it still has disadvantages—the two additional transforms required at each end add complexity, and image compressibility is still adversely affected.

One researcher proposes performing one or more of a group of shuffling operations on the Discrete Cosine Transform (DCT) coefficients of an image. L. Tang, "Methods for encrypting and decrypting MPEG video data efficiently," *Proc. The Fourth ACM International Multimedia Conference* (*ACM Multimedia '96*), pp. 219–229, scrambles each of the 8×8 blocks of DCT coefficients obtained during MPEG transform coding, before the coefficients are input to the MPEG entropy coder. This scrambling may entail 1) shuffling the AC coefficients within each block, 2) shuffling the AC coefficients using two shuffle tables (with a second random variable determining which shuffle table to apply to each block), 3) grouping the DC coefficients from eight blocks and encrypting the group with DES, and 4) splitting the DC coefficient from each block into two DC bit patterns, placing one of these in the last AC coefficient position of the block, and then scrambling all coefficients for the block. Although these techniques are not complex and provide a reasonable level of security, they change the statistical properties (e.g., the run-length characteristics) of the DCT coefficients. As a result, they may increase the bit rate of the compressed video by as much as 50%. This approach is also not very secure for transcoding at intermediate routers because the cryptographic key is needed to decrypt before requantization.

SUMMARY OF THE INVENTION

It is recognized herein that digital image encryption presents a set of issues, aside from security, that are unique in the data cryptography field. A digital image scrambling scheme should have a relatively simple implementation, amenable to low-cost decoding equipment and low-delay requirement for real-time interactive applications. It should have a minimum adverse impact on the compressibility of the image. It should preferably be independent of the bit-stream compression selected for the image, and allow compression transcoding without decryption. It should provide good overall security, although it may also be preferable in some systems to allow non-authorized users a level of transparency, both to entice them to pay for full transparency, and to discourage code-breaking.

The present invention provides digital image scrambling that meets the objectives outlined above. It is apparently the first digital image scrambling approach that can meet each of these objectives without compromise. Preferably, the invention accomplishes these objectives by operating on transformed images, prior to Huffman, run-length, arithmetic, embedded, or other entropy coding. The encryption/decryption operations performed by the invention are designed to preserve, as much as possible, the transformed image properties that allow entropy coders to efficiently compress an image. And the preferred encryption operations are computationally inexpensive operations, such as block shuffling and bit-scrambling on a subset of bits.

In accordance with a first aspect of the invention, a method of encrypting a digital image is disclosed. The method includes applying a space-frequency transform to the image, thereby generating a transform coefficient map. The map is then encrypted using one or more encryption techniques selected from the following: scrambling the sign bits of the coefficients in the map; scrambling the refinement bits of the coefficients; partitioning the map into a set of two-dimensional coefficient blocks and shuffling selected blocks within the map; and grouping a set of transform coefficients from a spatial frequency subband and shuffling the transform coefficients within the group.

In a second aspect of the invention, several methods of encrypting a digital image are disclosed. In one method, a group of bits are selected across a block of data, the group having lower than average predicted compressibility, as compared to the predicted compressibility of the block of data as a whole. These bits are then scrambled. In a second method, a motion-compensation data component of a digital video stream is selectively scrambled.

In accordance with another aspect of the invention, an image encryption system is disclosed. The system comprises an encryption buffer that accepts transformed image data, along with at least one encryption subsystem operating on transform data stored in the buffer. The subsystem(s) can include a sign bit scrambler, a block shuffler, a block rotator, and a subband coefficient shuffler. The system may further comprise a quantizer and/or an entropy coder that operates on encrypted transform data.

In a further aspect of the invention, an encrypted image decryption system is disclosed. The system comprises a decryption buffer that accepts encrypted transform data, along with at least one decryption subsystem operating on encrypted transform data stored in the buffer. The subsystem(s) can include a sign bit descrambler, a block deshuffler, a block derotator, and a subband coefficient deshuffler. The system may further comprise an entropy decoder and/or a dequantizer that operates on entropy coded encrypted transform data.

BRIEF DESCRIPTION OF THE DRAWING

The invention may be best understood by reading the disclosure with reference to the drawing, wherein:

FIG. 11 depicts the subband organization for a wavelet transform coefficient map;

FIG. 12 illustrates a process for shuffling subbands of a wavelet transform;

FIGS. 16 and 17 illustrate, respectively, an encrypter and a decrypter according to embodiments of the invention.

DETAILED DESCRIPTION OF THE PREFERRED EMBODIMENTS

The preferred embodiments are disclosed below as applied 1) to a DCT-based image codec, such as those set forth in the JPEG, MPEG-1, MPEG-2, and H.26X standards, and 2) to a wavelet-based image codec. These embodiments were selected by way of illustration and not by way of limitation. Indeed, the disclosed embodiments apply equally to other image codecs that exhibit the properties exploited in the present invention.

Several terms appearing in this disclosure have defined meanings. A space-frequency transform represents an image as a set of coefficients, each coefficient containing both spatial frequency and spatial location information. Block-based spatial frequency transforms and wavelet transforms are examples. A transform coefficient map contains space-frequency transform coefficients. Although typically stored in a two-dimentional array, the map can practically be stored in any desired format. The definition of a map includes sub-maps and space-frequency-time transform coefficient maps.

Shuffling refers to a process that randomizes the order of its input to produce a re-ordered output. Scrambling refers to a process that randomizes its input in any manner to produce an output. A key refers to any symbol or device that allows a user to access an encryption/decryption sequence.

Figure 1:
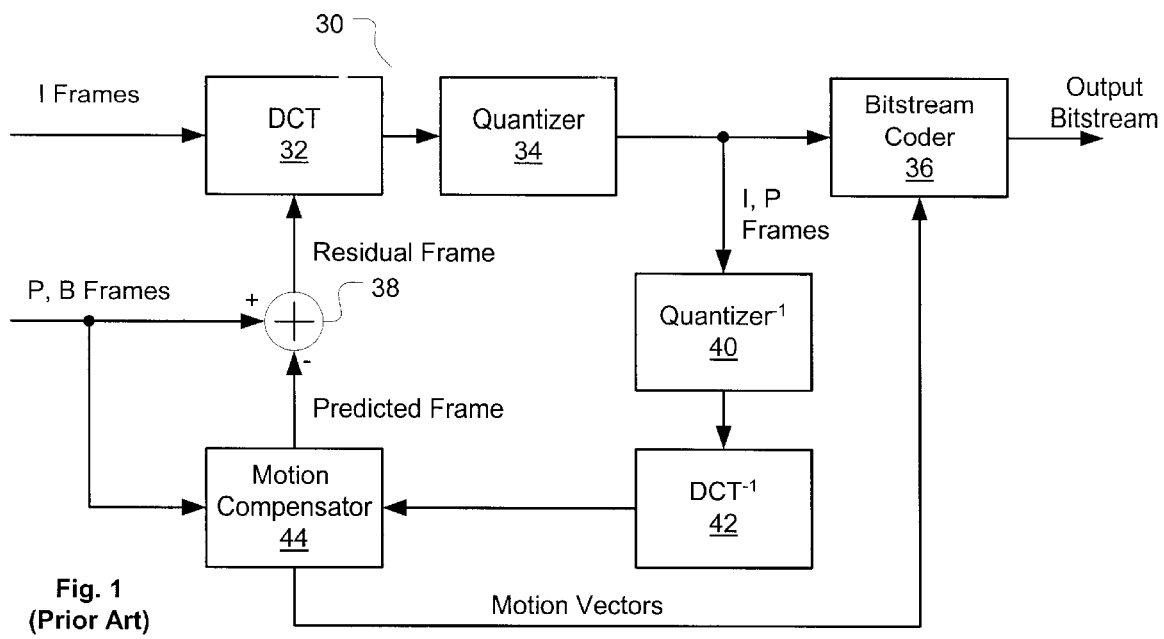
FIG. 1 shows a prior art MPEG video coder.

FIG. 1 shows the general architecture for an MPEG-like video coder 30. An input image stream is divided into I, P, and B frames for input to the system. I (intracoded) frames are directly coded, and P (predicted) and B (bidirectionally predicted) frames are partially indirectly coded using information from other frames. An operator may select the frequency of I, P, and B frames in the image sequence, with the restriction that at least some I frames must be used. An I frame and its dependent P and B frames are generally referred to as a group of pictures (GOP).

Figure 2:
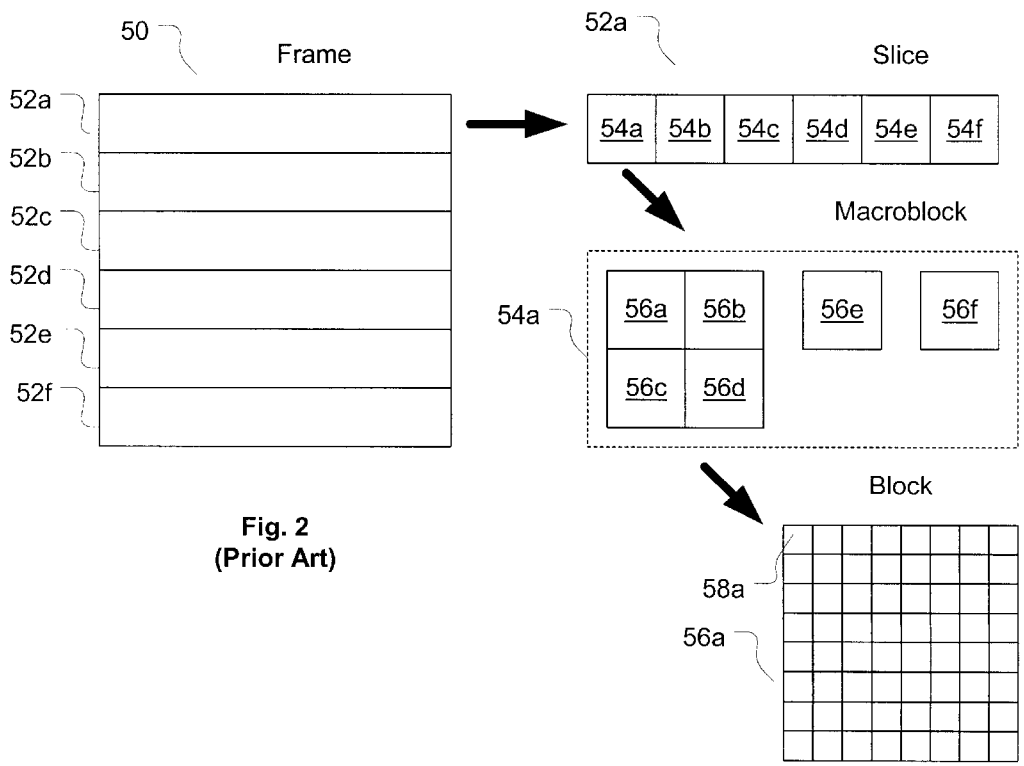
FIG. 2 shows data organization for an MPEG video frame.

DCT 32 operates on 8×8 pixel blocks of an input image (see FIG. 2). At the input to DCT 32, image 50 is divided into horizontal slices 52a–f (the number of slices shown is chosen for illustration, and is not fixed in general) for processing. For the luma component of a color image, each slice is 16 pixels wide. The corresponding chroma components of the image are sampled at half the spatial frequency of the luma component, such that a chroma slice is 8 pixels high. Each slice (see slice 52a) is further partitioned into macroblocks 54a–f (the number of macroblocks shown is chosen for illustration, and is not fixed in general). Each macroblock contains six blocks (e.g., blocks 56a–f, such that the first four blocks 56a–f together cover a 16×16 pixel area from the luma component of the current slice, and the fifth and sixth blocks 56e and 56f cover corresponding 8×8 areas taken respectively from the two chroma components of the slice.

Figure 3:
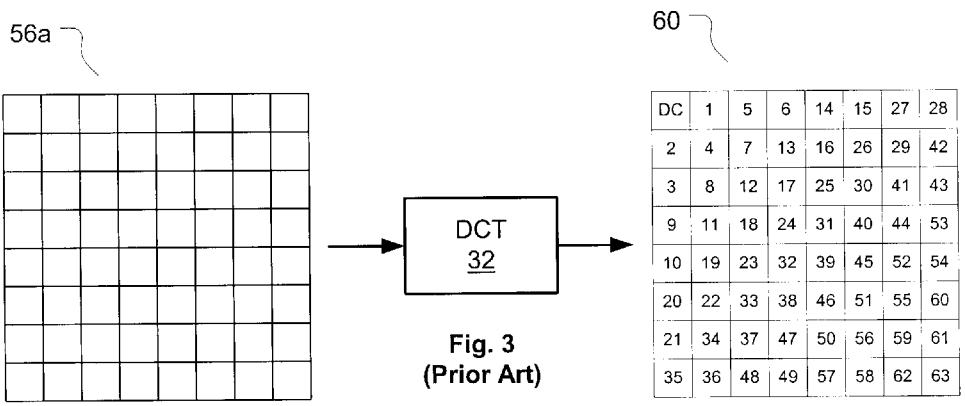
FIG. 3 illustrates DCT and transform coefficient ordering for an MPEG video block.

FIG. 3 illustrates the operation of a DCT 32 that outputs block coefficients in zigzag order. DCT 32 performs a two-dimensional discrete cosine transform on 8×8 pixel block 56a to produce a corresponding 8×8 block of transform coefficients 60. The upper-leftmost coefficient DC represents the average intensity of block 56a. As one moves down and/or right in coefficient block 60, the spatial frequencies represented by the coefficients increase. Thus the zigzag order, indicated by the numbering of the coefficients in block 60, approximately orders the coefficients from lowest to highest spatial frequencies.

Once the coefficients of block 60 are arranged in zigzag order, quantizer 34 of FIG. 1 scales the coefficients (note that zigzag ordering can also be performed after quantization). The DC coefficient quantizer step size may be fixed. The coefficients are quantized to a scale commensurate with their range of values.

Bitstream coder 36 may treat the DC coefficients differently also. Within each slice, the DC coefficients may be differentially-coded and transmitted using a variable-length code. The remaining 63 coefficients, together with the DC coefficient in some cases, are run-length encoded to take advantage of the sparse population of non-zero coefficients in a typical block 60, particularly at the highest frequencies. The bitstream output of bitstream coder 36 comprises a block-by-block coding as described, with headers inserted at the macroblock, slice, frame, and group of pictures level.

At the video frame input to coder 30, the group of pictures sequence is used to determine whether the next incoming frame will be an I, P, or B frame. I frames are input directly to DCT 32 (note that a JPEG coder processes single image frames in a manner similar to I frame video processing in coder 30). P and B frames are not input directly to DCT 30, but instead go through a prediction channel that attempts to exploit the temporal redundancies found in most video sequences.

Motion compensator 44 attempts to match the blocks of a P or B frame with the blocks of a prediction frame or frames. For instance, the first P frame following an I frame is predicted from that I frame. The quantized I frame appearing at the output of quantizer 34 is "decoded" by an inverse quantizer 40 and an inverse DCT 42 to represent the I frame as it will be seen by a decoder operating on the bitstream output of coder 30. Motion compensator 44 attempts to find a best fit prediction for each macroblock of the P frame, based on the quantized prediction frame. The offset from the macroblock location to the prediction location with the best fit is described by a motion vector. In some cases (such as where a new object is introduced to the scene) prediction can be poor, and motion compensator 44 opts not to predict that macroblock, but to let it be intracoded like an I frame instead.

Motion compensator 44 produces two outputs for each input P or B frame: a set of motion vectors and a predicted frame. The motion vectors are supplied to bitstream coder 36 for output coding. The predicted frame is subtracted from the input P or B frame in image adder 38 to form a residual frame. The residual frame is then input to DCT 32 in the same manner as an I frame.

Figure 4:
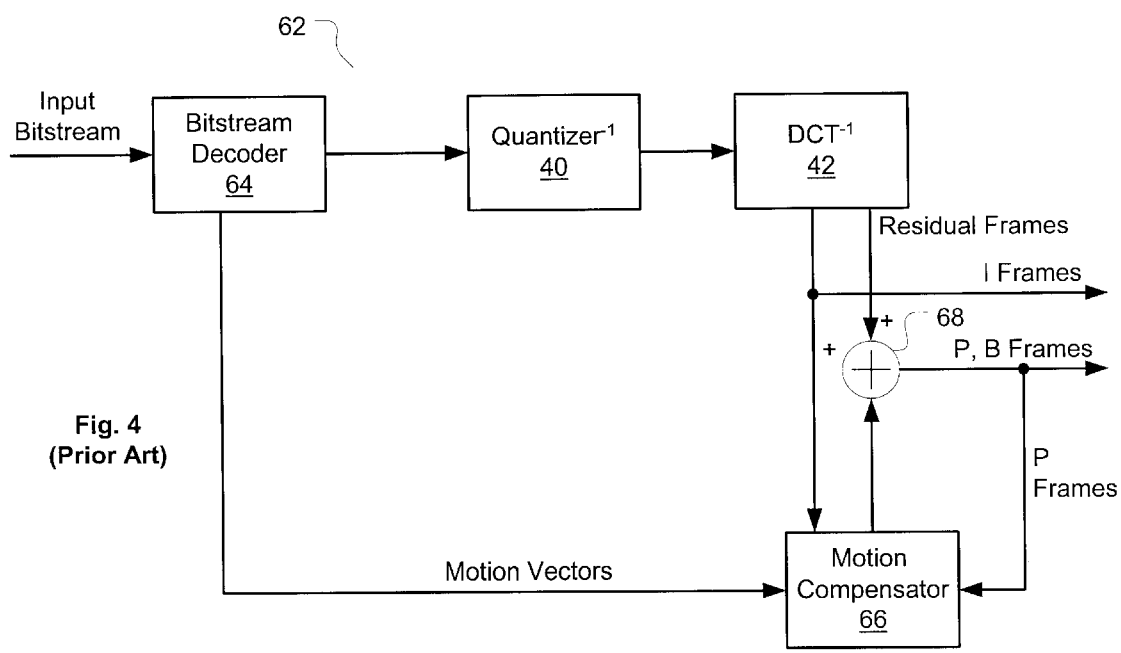
FIG. 4 shows a prior art MPEG video decoder.

FIG. 4 shows a video decoder 62 appropriate for decoding a bitstream produced by video coder 30. A bitstream decoder 64 recovers the transform coefficient and motion vector information from the coded bitstream. The transform coefficient information is passed through inverse quantizer 40 and inverse DCT 42. The I frames are fully reconstructed at this point, and can be output as well as fed to motion compensator 66. Motion compensator 66 constructs prediction frames using the motion vector information and appropriate I and P frame data. Image adder 68 combines prediction frames with residual frames to reconstruct P and B frames.

Figure 5:
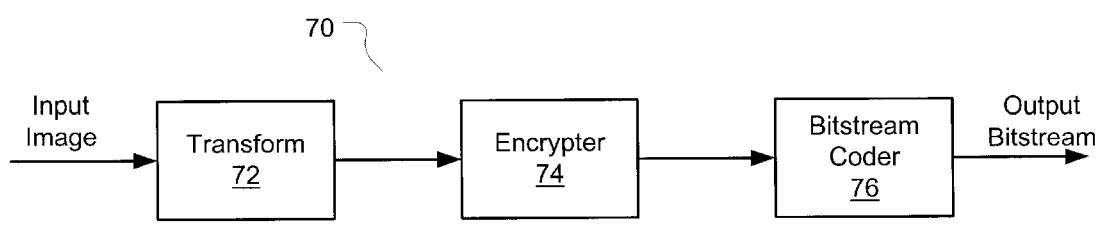
FIGS. 5 and 6 show, respectively, simplified block diagrams for an image coder and an image decoder according to the invention.
Figure 6:
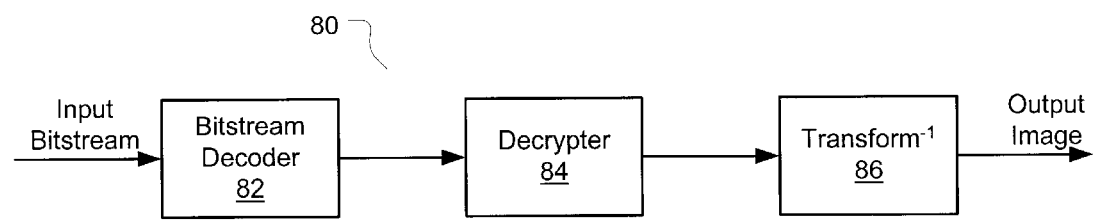

FIGS. 5 and 6 show, respectively, general block diagrams for an image encrypter and coder 70 and an encrypted image decoder 80 according to the invention. In coder 70, an encrypter 74 is inserted between image transform 72 and bitstream coder 76. In decoder 80, a corresponding decrypter 84 is inserted between bitstream decoder 82 and inverse image transform 86.

Encryption Methods

In most prior art image encryption, scrambling is performed either prior to image transformation or subsequent to bitstream coding. Although one researcher (L. Tang, "Methods for encrypting and decrypting MPEG video data efficiently," discussed in the Background of the Invention) performs scrambling between image transformation and bitstream coding, his method differs from the present invention significantly, such that most of the advantages of the present invention are not found in Tang's method.

Subband Shuffling

The present invention includes two general sub-methods of encryption, each based on the recognition of a different characteristic of transform coefficient data. The first sub-method recognizes that shuffling the arrangement of coefficients in a transform coefficient map can provide effective security without destroying compressibility, as long as the shuffling does not destroy the low-entropy aspects of the map relied upon by the bitstream coder. The second sub-method recognizes that although wholesale encryption of individual transform coefficients is generally undesirable (because coefficient encryption adds complexity and destroys the compressibility of the low-entropy coefficient data), some bits of individual transform coefficients have high entropy and can thus be encrypted without greatly affecting compressibility.

Figure 7:
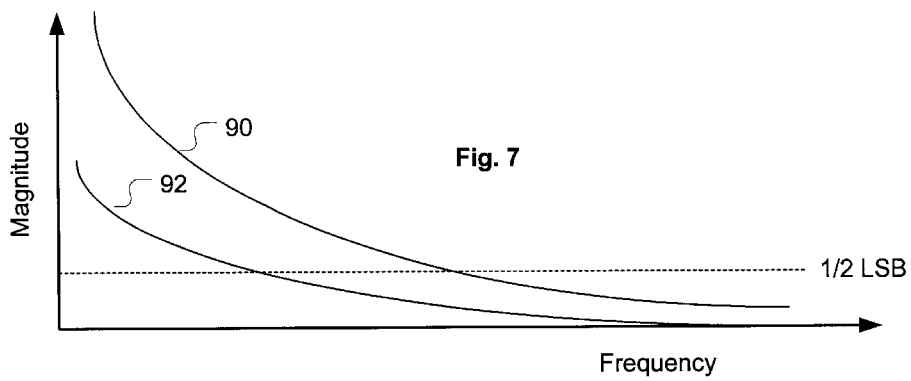
FIG. 7 shows confidence interval trends for DCT coefficient magnitude as a function of spatial frequency.

Several examples will illustrate how the present invention shuffles transform coefficients without destroying compressibility. FIG. 7 shows a hypothetical a priori confidence interval (bounded by lines 90 and 92) for quantized DCT coefficients, as a function of spatial frequency. After fixed quantization, higher frequency terms are much more likely to fall below the half-LSB cutoff line 94 than are low frequency terms—consequently, there is a much higher likelihood that such terms will be represented as a zero by the coder.

Most MPEG-type bitstream coders rely on the statistics of an average coefficient block to provide efficient coding. Note that after zigzag ordering, the coefficients are arranged approximately in increasing frequency. The bitstream coder uses a variable-length codeword run-length coding technique that generally assigns shorter codewords to combinations of coefficient values and run lengths that are more likely, based on the concepts illustrated in FIG. 7. Thus, the shorter codewords tend to favor runs followed by small coefficients.

In the coefficient shuffling method proposed by Tang, the zigzag coefficient ordering is destroyed. This generally shortens average run-lengths and places some large coefficients in unlikely places in the coding order. As a result, the run-length coder will not operate efficiently. With Tang's method, up to 50% increases in bit rate are observed, mainly due to this effect.

Figure 8:
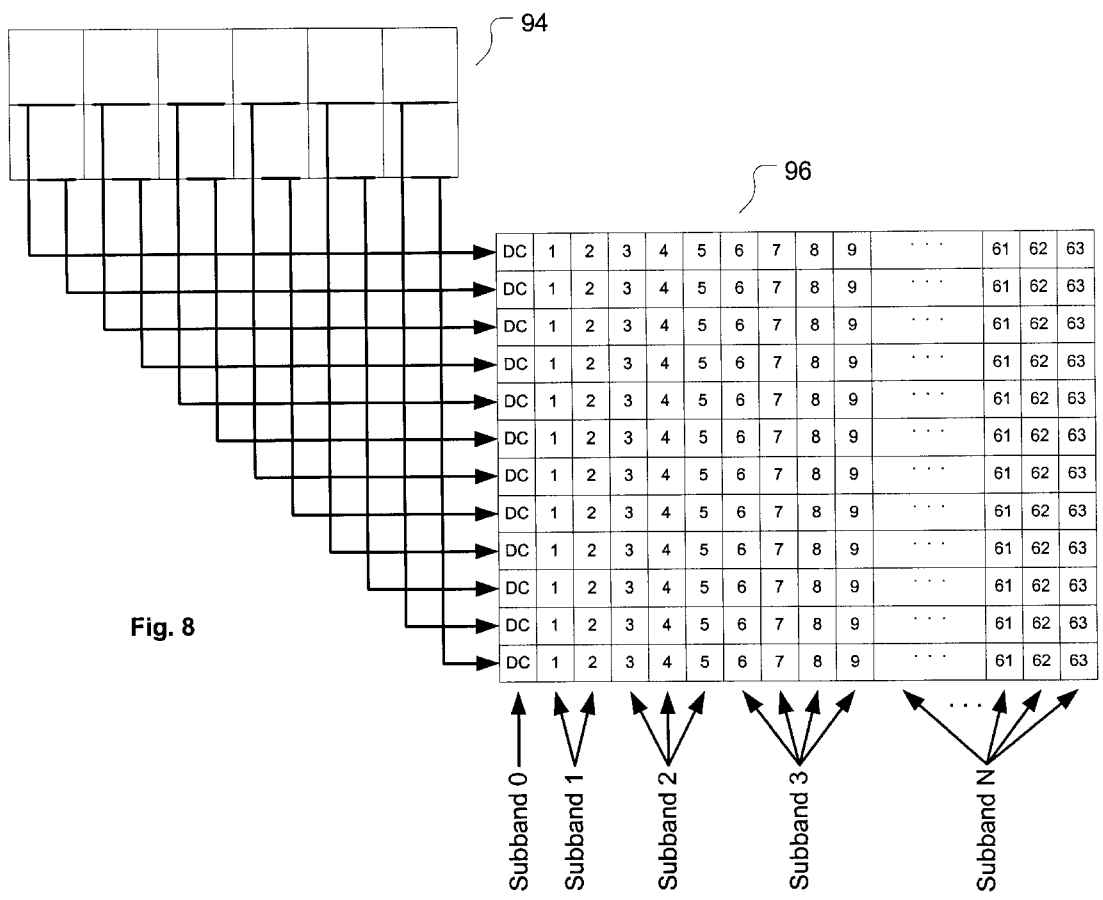
FIG. 8 illustrates sub-band ordering for DCT coefficients from the luminance component of an image slice.

The present invention includes a coefficient shuffling method that provides effective scrambling without destroying the statistics relied upon by a run-length coder. In one embodiment illustrated in FIG. 8, a slice 94 of a DCT coefficient map is input to the coefficient shuffler. The blocks are re-arranged, at least conceptually if not physically, in zigzag order across rows, and with the blocks stacked down columns as shown in map 96.

With the DCT coefficients arranged as shown in map 96, it can be appreciated that each column represents the same spatial frequency, as measured at different 8–8 spatial locations in the original image slice. Although the coefficients in a given column of map 96 are not expected to have identical values, they should have a similar a priori statistical distribution. Thus the coefficients in the column can in many cases be re-shuffled without significantly degrading the statistics relied upon by a run-length coder.

In one embodiment, map 96 is divided into "subbands" of coefficients with similar spatial frequency magnitude. Although subbands can be as small as a single column, one convenient subband division (shown in FIG. 8) groups coefficients along one or more diagonals of the original coefficient block (corresponding to one or more "zigs" and "zags") together.

Figure 9:
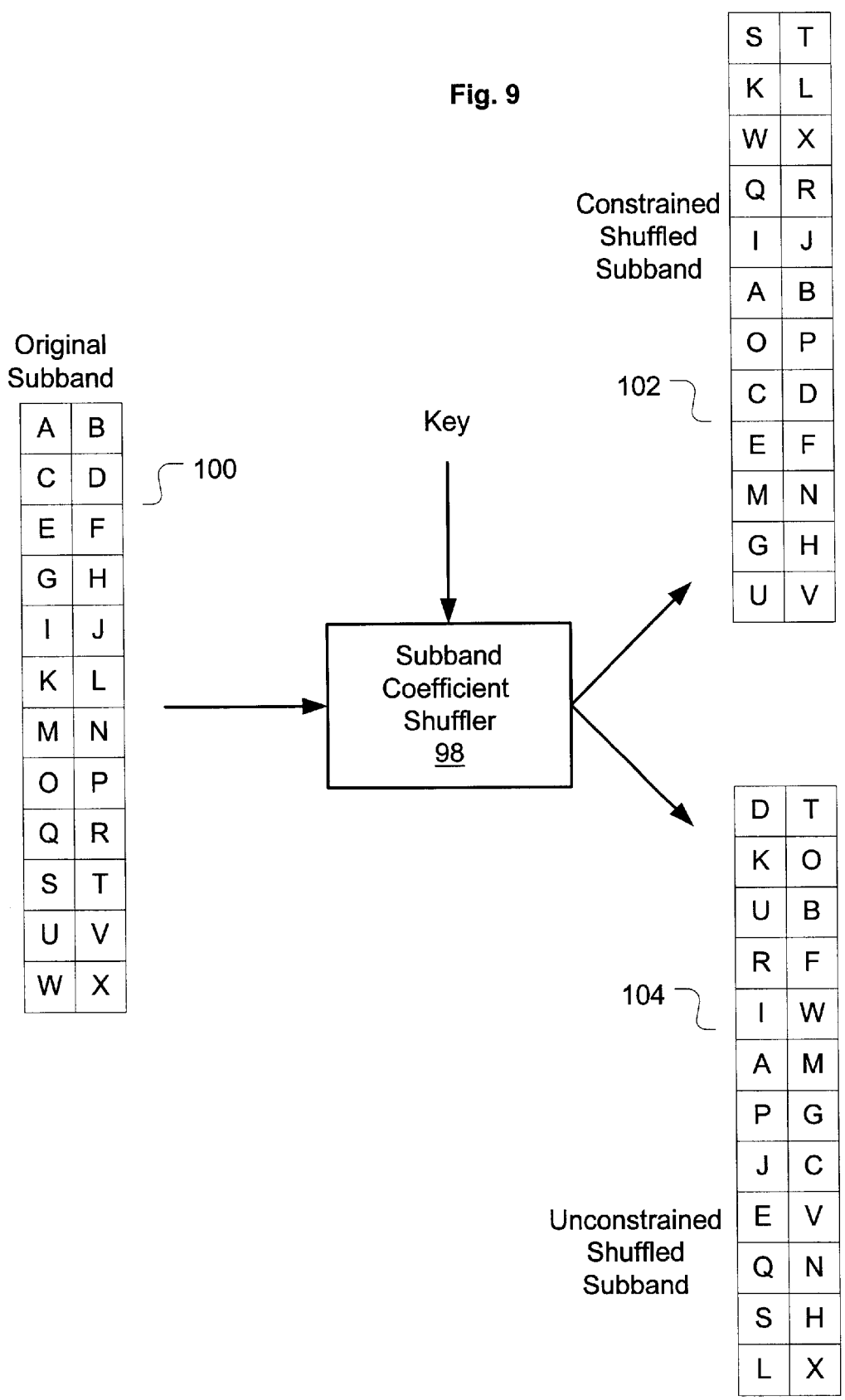
FIGS. 9 and 10 illustrate subband shuffling techniques according to an embodiment of the invention.

The coefficients in each subband are shuffled within that subband. Shuffling tables will generally be different for different subbands and for the same subbands of different slices. FIG. 9 shows an example of subband shuffling for a particular subband 100 containing coefficients A through X. The subband is passed to a subband coefficient shuffler 98, along with a key. The key is used to create a shuffling map (alternately, the shuffling map can be supplied directly to shuffler 98). Shuffler 98 uses the shuffling map to produce a shuffled subband. In a simplified embodiment, subband coefficients taken from the same block remain together after shuffling, producing a shuffled subband such as subband 102. This allows shuffling map size to be independent of subband width. In a more complex embodiment, coefficients are shuffled without limitation, producing a shuffled subband such as subband 104.

Figure 10:
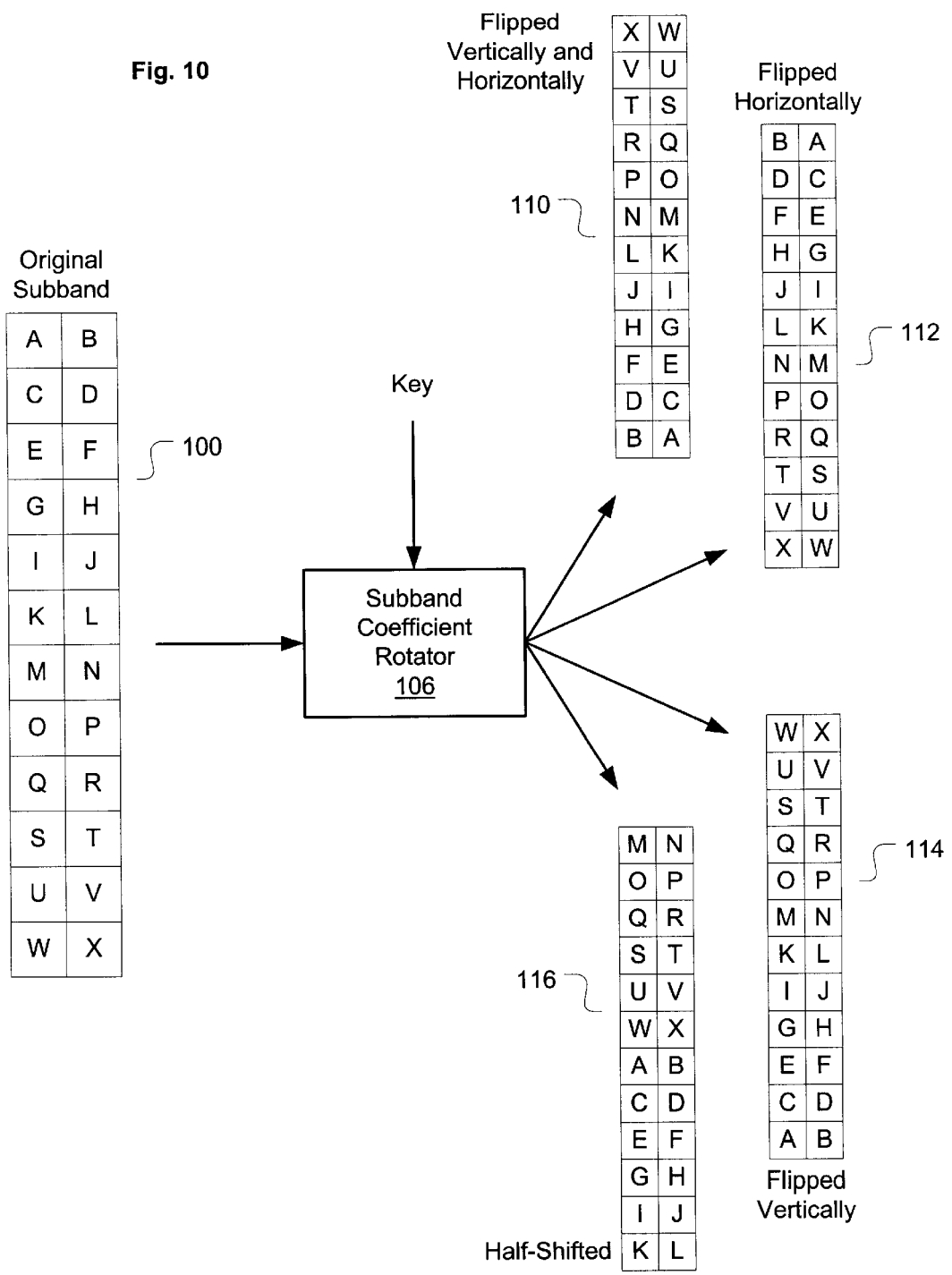

FIG. 10 shows an even simpler subband shuffling approach. The shuffler is essentially reduced to a subband rotator 106 that uses a small set of possible shuffle outputs, with the key being used to select the shuffle table. For example, the possible shuffle results may be limited to one of four values with a two-bit key—e.g., half-shifting the coefficients downwards (output subband 116), flipping the coefficients vertically (output subband 114), flipping them horizontally (output subband 112), or flipping them in both directions (output subband 110). Generally, a small number of shuffle permutations will still render an unintelligible inverse-transformed image (without deciphering), although the permutations that must be attempted by a code breaker are reduced.

This same shuffling concept can be equally applied to other types of image coders, for example, a wavelet transform coder. A wavelet transform coder separates an image into subbands representing different spatial frequencies, with each subband retaining the spatial arrangement of the original image (but at a different resolution). FIG. 11 shows ten subbands (LH1–3, HL1–3, HH1–3, and LL3) that represent a three-level wavelet decomposition of an input frame obtained by separable wavelet filtering along the rows and columns of an input frame.

Like in the DCT-based transform discussed above, the statistics of the coefficient distribution generally differ from subband to subband. Also, because the coefficients of the subbands are arranged in the spatial arrangement of the original image, neighboring coefficient correlation exists that can be exploited by a bitstream coder. The goal of the present invention is to provide a coefficient shuffling method that does not destroy these statistical properties.

In one embodiment, each subband is considered separately for shuffling. Shuffling tables will generally be different for different subbands. Each subband is divided into a number of blocks of the same size, for example the sixteen blocks A–P shown for subband LH1 in FIG. 12. The blocked subband is then input, along with a shuffling key or shuffling map, to a block shuffler 122. Block shuffler 122 outputs a shuffled subband 124.

Since the scrambling performed by block shuffler 122 is block-based, it retains most of the local 2-D statistics of the subband signal. Therefore, the negative impact on subsequent statistical coding is minimized, while the visual effect of the shuffling on a decoded encrypted image is dramatic. In general, block size can be selected to trade security for statistical coding impact, with larger and fewer blocks producing less security but less impact on statistical coding.

To further improve security with little impact on statistical coding, shuffled subband 124 can be input, along with a shuffling key or shuffling map, to a block rotator 126. Block rotator 126 selects one of eight possible orientations (0, 90, 180, and 270 degree rotations for each of the original block and a transposed block) for each block and rotates/transposes the block to that orientation, producing rotated and shuffled subband 128.

Bit Scrambling

Figure 13:
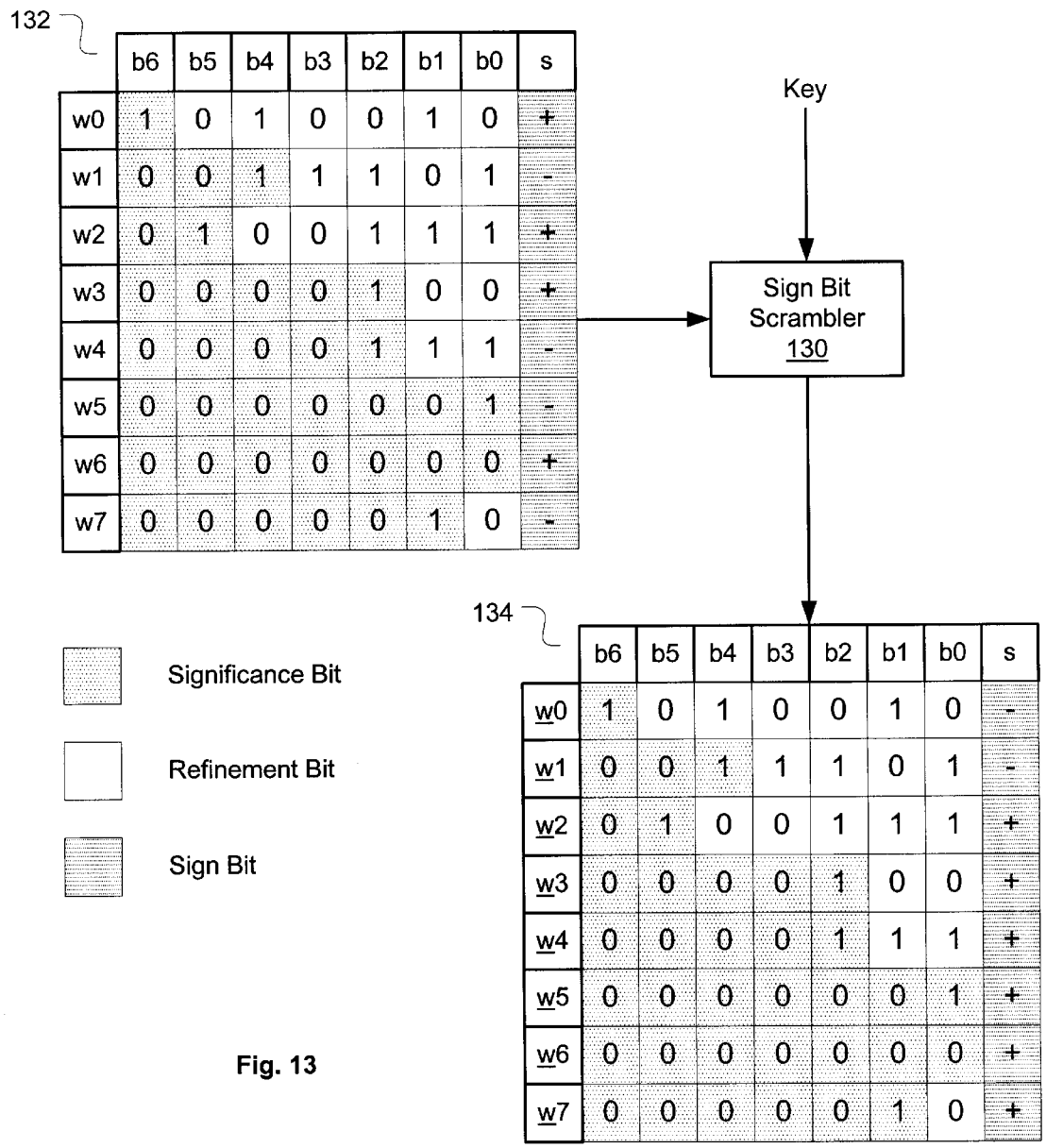
FIG. 13 illustrates a process for scrambling bits of a group of coefficients.

Several examples will illustrate the second invention sub-method, which scrambles selected bits in the transform coefficients to encrypt an image. FIG. 13 shows a table 132 of an arbitrary group of eight coefficients values w0–w7, each having 7 magnitude bits b0–b6, with b6 being the most significant bit and b0 being the least significant bit, and a sign bit s. Directly encrypting each coefficient in the table is costly, both in terms of computing power needed to decrypt the coefficients, and in terms of compressibility, since encryption randomizes the coefficient values.

Each bit of a coefficient can be viewed as one of three types. Significance bits for a coefficient are the most significant bit with a value of 1, and any preceding bits with a value of 0. These bits limit the magnitude of the coefficient to a known range. Refinement bits are the remaining magnitude bits, used to refine the coefficient within the known range. The sign bit determines whether the known range is positive or negative.

It is recognized herein that the efficiency of a bitstream coder differs depending on the bit type being coded. Most transforms create a large number of coefficients having small magnitude, meaning that a significance bit is much more likely to have a value of 0 than a value of 1. Zigzag ordering and wavelet transforms also tend to group small magnitude coefficients together. Thus the significance bits have relatively low entropy, and are therefore highly compressible. On the other hand, most transforms produce coefficients with sign bits that have an approximately equal probability of being a 1 or a 0, and that are highly uncorrelated with the sign bits of neighboring coefficients. Refinement bits also tend to have approximately equal probabilities of 1 or 0, and are highly uncorrelated with neighboring refinement bits. Because of their high entropy (and limited predictability), the sign bits and refinement bits are not highly compressible.

In one embodiment, the present invention selects individual non-significance bits from each coefficient and scramble s these. Because these bits have limited predictability to start with, scrambling them results in a negligible decrease in bitstream coding efficiency. In FIG. 13, the coefficients from table 132 are supplied to a sign bit scrambler 130, along with a cryptographic key. The key is used to scramble the sign bits (e.g., by exclusive-ORing the sign bits with a pseudorandom bitstream), producing a table 134 of distorted coefficients w0–w7. Roughly half of the coefficients in table 134 will have the wrong sign, although a code breaker will not know which ones. Because the sign-inverted coefficients distribute their energy over the entire block of pixels they were derived from, sign bit scrambling is quite effective at producing severe degradation in image quality.

In a transform of an image having all positive pixel values, the sign of a low-pass or "DC" coefficient is always positive unless the image average is removed from the term. Simply scrambling the sign bit on such a coefficient may be an ineffective form of security, since the DC coefficient locations are either known or can be easily guessed at. In this case, the "sign" of the term can be toggled by inverting the coefficient magnitude about a predefined value, such as the half-maximum value for the coefficient. Alternately, if the DC-coefficients are to be differentially coded, the sign bits can be scrambled after differential coding.

In another embodiment, the refinement bits of the coefficients can be scrambled. This does not provide the same level of degradation as sign bit scrambling, because the significance bits and sign bit define the magnitude range, after which the refinement bits only add at most plus or minus 33% to the coefficient value. Nevertheless, scrambling refinement bits adds an additional level of image degradation and security at low added complexity. A refinement bit scrambler can be implemented like sign bit scrambler 130. The only difference is that refinement bits do not occupy a specific column in table 132. A refinement bit scrambler may thus choose to scramble only the most significant, or the two most significant, refinement bits from each coefficient. This latter option would correspond to scrambling the following bits in the specific case of table 132: bits b4 and b5 of coefficient w0; bits b2 and b3 of w1; bits b4 and b3 of w2; bits b0 and b1 of w3 and w4; no bits for w5 and w6; and bit b0 of w7.

Other forms of selective bit scrambling according to the invention can be devised to work with specific known bitstream coders. For example, MPEG 1transmits DCT coefficients with a known variable-length code based on run length and coefficient value. For a given run-length, many coefficient values may produce a variable-length code of the same length. Any such coefficient value can be permuted to any other such coefficient value without increasing the MPEG 1bitstream coder's bit rate. The previous embodiments enable encryption of space-frequency transforms for still images, intra-coded video frames, and residual video frames related to temporal prediction. A further embodiment greatly improves the encryption for predicted video, with little penalty in processing power or bandwidth. In this embodiment, motion vector information is scrambled, e.g., using one of the methods described above.

Motion Vector Scrambling

Motion compensation creates an array of motion vectors, for example, one vector per macroblock of a frame to be coded. These vectors reference a position in a reference frame (e.g., the immediately preceding I frame) having the best fit to the macroblock to be coded. A decoder constructs a predicted frame by offsetting into the same reference frame using the motion vectors, extracting pixels from that reference frame at the positions indicated by the motion vectors, and combining these pixels in a new frame. Thus the predicted frame (and the output frame) can be distorted by changing the sign bits of motion vectors (if the motion vectors are to be differentially coded, the sign bits can be scrambled after differential coding), shuffling the motion vectors within the motion vector array, or otherwise distorting the motion vectors.

Hardware Implementations

Figure 14:
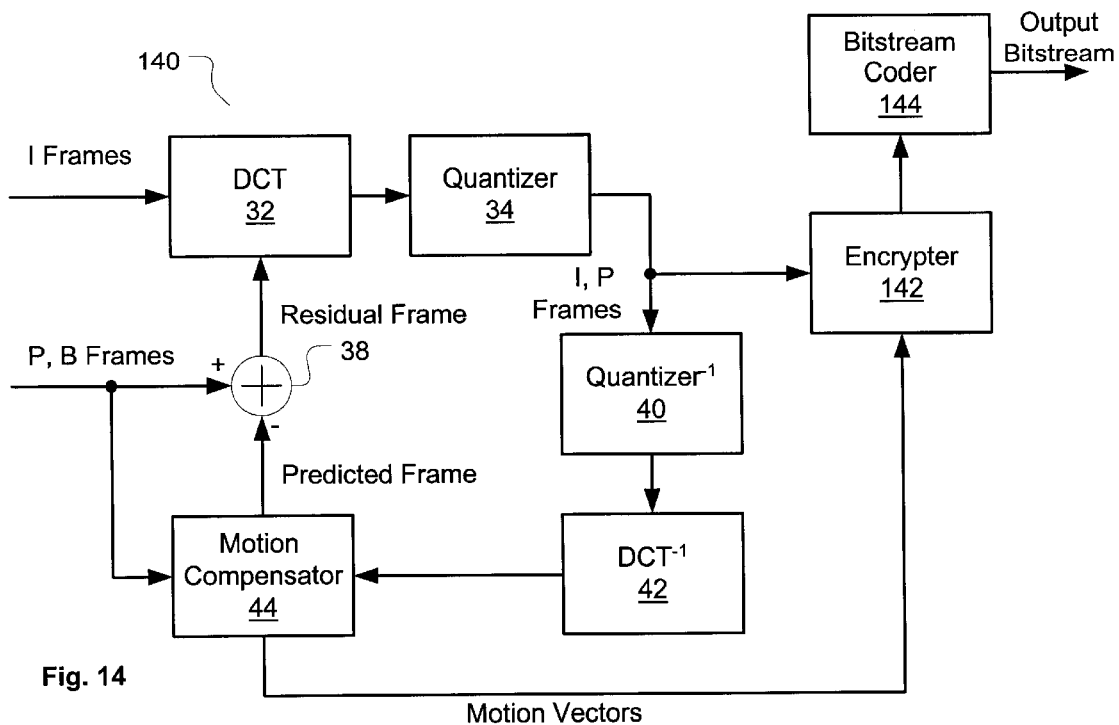
FIGS. 14 and 15 illustrate, respectively, a video coder and a video decoder according to embodiments of the invention.

FIG. 14 shows a video coder 140 according to an embodiment of the invention. Coder 140 is compatible with MPEG video coding, and contains many of the functions found in video coder 30 of FIG. 1. But in coder 140, the output of quantizer 34 and the motion vector output of motion compensator 44 are fed to encrypter 142 for encryption by one or more of the methods disclosed above. After encryption, the encrypted DCT transform coefficients and motion vectors are sent to a bitstream coder 144.

Although an encrypter can exist as a hardwired sequence of functions, a configurable encrypter 142 can be implemented as shown in the block diagram of FIG. 16. A data router/buffer 160 accepts transform coefficients, motion vectors (if applicable), and one or more cryptographic keys or shuffle tables, and caches these during encryption. According to the encryption configuration selected, router/buffer 160 makes data available in an appropriate sequence to one or more of the functions connected to router/buffer 160. For example, upon receiving each transform coefficient block, the block may first be sent to a sign bit handler 162 and bit scrambler 170 for sign bit scrambling. When all blocks of a slice are received and sign bit scrambled, the slice may be directed to subband blocking 168, and then one or more of the subband blocks can be sent to coefficient shuffler 172. After bit scrambling and coefficient shuffling, the buffered slice is output to bitstream coder 144.

Figure 15:
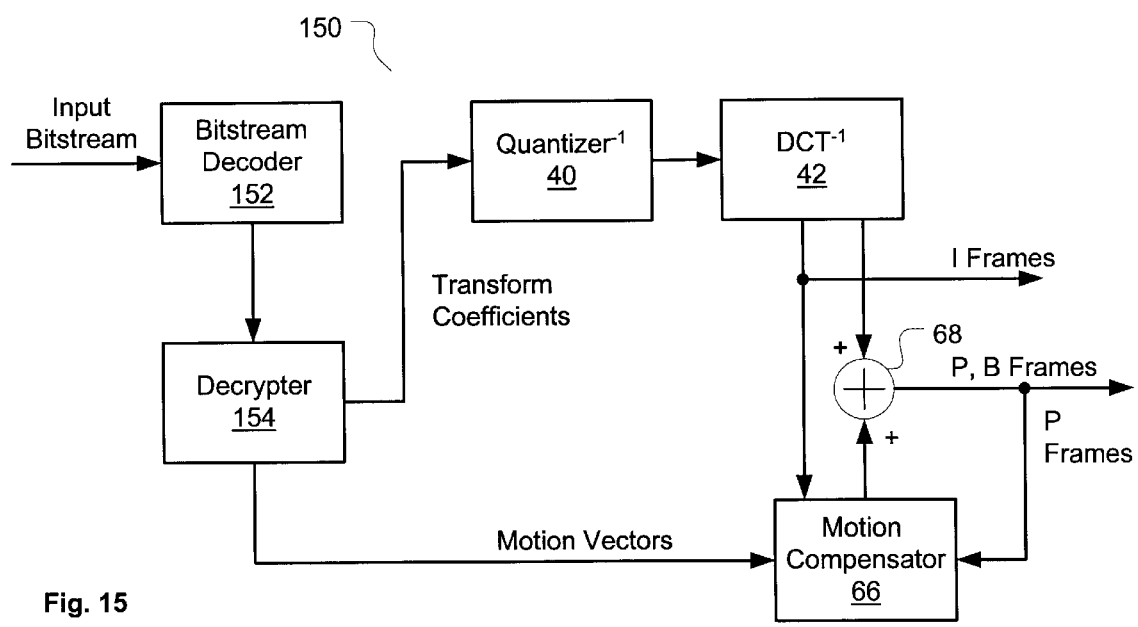

Decoder 150, and its associated decrypter 154 (FIGS. 15 and 17), essentially reverse the process to recover the transform coefficients and motion vectors as originally supplied to encrypter 142. Decrypter 154 has a data router/buffer 180 that performs similar functions as data router/buffer 160. Bit descrambler 190, coefficient deshuffler 192, block deshuffler 194, and block derotator 196 invert the processes of their corresponding blocks in FIG. 16.

A prior art decoder, such as decoder 62 of FIG. 4, can receive a bitstream produced by video coder 140 and comprehend it as an MPEG bitstream. But the decoded video signal will appear scrambled. Likewise, a decoder 150 according to the invention, but without access to the appropriate cryptographic key, can comprehend such a bitstream as an MPEG bitstream but will be unable to descramble the video. A level of transparency can be provided to users of prior art decoders and decrypting decoders without an appropriate key, by choosing not to encrypt low-frequency subband information. These users will be able to view a noisy, low-detail version of the video. Likewise, a clear picture may require different keys for different subbands, such that users may have the ability to receive degraded video with one key, and clear video if they possess all keys.

Another feature of the disclosed embodiments is that an output bitstream can be transcoded without knowledge of the key. For example, an encrypted output bitstream can be passed through an appropriate bitstream decoder, and then through a new bitstream encoder. Alternately, in a coder such as an embedded coder, the output bitstream for a frame can be truncated at any point without affecting the ability of a decrypter according to the invention to decrypt whatever portion of the bitstream remains.

The security of the scrambling process can be analyzed as follows. For the encryption of the sign bits, if a code-breaker is to completely recover a single original frame, an exhaustive search of $2^M$ trials is required, where M is the number of non-zero coefficients in the frame. For a 512×512 frame, assuming, conservatively, that only 256 non-zero coefficients exist, the number of required trials is about $10^{75}$. If an attacker uses a smoothness constraint in the spatial domain to search for the best estimate of the original sign bits, each trial includes an inverse transformation (at least a local inverse transformation). Of course, since the encryption of the sign may not render a completely indiscernible image, an attacker may not make such an effort to recover a perfect image.

The next step, block shuffling, will render a completely incomprehensible image, as will be shown in the experimental result section. Theoretically, it is very difficult to recover the image frame without knowing the shuffling table. Consider a subband that contains 64 blocks. These 64 blocks are shuffled to one of 64! possible permutations. Of course, there may be many blocks that contain only zero coefficients, especially for high frequency subbands. Assuming there are n zero blocks and all other blocks are different from each other, then the number of different permutations is 64!/n!. If n=48, then the number of different permutations is about $10^{28}$, with each permutation requiring inverse transforms for all blocks affected by the subband permutation. Given multiple subbands per group of transform blocks, multiple groups per frame, and multiple frames per second, it quickly becomes infeasible to perform any appreciable amount of code breaking on a block shuffled transform image. It should be noted that with wavelet transform data, the attacker potentially may try to search for the best estimate directly in the transformed domain by exploiting some structure of the coefficient image such as edge continuity. This attack is, however, difficult to construct due to the uncorrelated nature of the coefficient image, particularly when there is no prior knowledge about the content of the video. Human interaction may be necessary to assist the recovery. That, however, consumes a lot more time for each trial, compared to automated recovery by computer.

Block rotation further increases the difficulty of recovering an original frame without the key. In this case, assuming eight possible ways of rotation, there are 512 (64×8) potential candidate blocks to fill 64 locations. Again, assuming there are n zero blocks in the decompressed subband and all other blocks are different from each other, then the number of different configurations is 512!/(8n)!, which is significantly larger than 64!/n!.

Each disclosed method can be employed individually or in combination, in any preferred order. The shuffling/rotation tables may not be the same for different video frames. For more secure video transmission, a single key can be used to generate a set of different shuffling/rotation tables for scrambling consecutive video frames. More dynamic shuffling/rotation tables make the system more secure, with the tradeoff being a slightly increased complexity. The key can also be updated as time progresses to provide a dynamic key-based scrambling system. Known methods for key generation, transmission, and usage can be employed in the system.

Shuffled blocks can be either contiguous, spatially distributed, or even randomly located throughout a frame. Contiguous blocks may be preferable, as this tends to reduce the memory requirements of the decoder and latency of the system.

In general, the scrambling of I frames will render the following P/B frames difficult to perceive due to the dependency of P/B frames on I frames. This may lead to the conclusion that P/B frames need not be scrambled. Although it may not be necessary to scramble all P and B frames, it is preferable that at least intra-coded blocks of those frames be scrambled, and more preferable that motion vector information be scrambled also.

Experimental Results

Wavelet-Based System

The experimental results are reported in tabular and in image format for a set of specific examples. Although the images in the attached Appendix illustrate the performance of the invention, they are not required for one to gain a complete understanding of the invention.

In the first set of experiments, a five-level wavelet decomposition is performed on an input image frame. The sign bits of the wavelet coefficients are first encrypted using a sequence of independent identical distributed (i.i.d.) pseudorandom bits with equal probability of 1 and −1, generated from a given key. The pseudorandom bits are exclusive-ORed with the original sign bits, and the resulting bits are used as the scrambled signs bits of the coefficients. Given the key and the scrambled signs, the original signs can be perfectly recovered by another exclusive-OR with the same sequence of pseudorandom bits. Image 1(*a*) of the Appendix shows an original image, while Image 1(*b*) shows the same image after sign encryption and decoding without decryption. Image 1(*b*) is significantly distorted, but the main structure of the image content is still discernible. This encrypted image provides some level of transparency.

For more security, blocks of wavelet coefficients are shuffled. For each subband, the coefficients are divided into 64 blocks of equal size. For example, if the image size is 512×512, then the highest level subbands will have a size of 256×256, and the lowest level subbands will have a size of 16×16. We divided each subband into 64 blocks, yielding 2×2 blocks for the lowest subband and 32×32 blocks for the highest subband.

There are many ways to generate the shuffling tables. In these experiments, the following procedure was used. The locations of the blocks were numbered 1, 2, . . . , 64. A [0,1] uniformly distributed pseudorandom number is generated using the key as the seed. The interval [0,1] is divided into 64 subintervals 1–64 of equal length. Suppose the random number falls into subinterval j, then the first block will be mapped to the $j^{th}$ location. Then the interval [0,1] is divided into 63 subintervals of equal length, and a second random number is generated. Depending on which subinterval the random number locates in, the second block will be mapped to one of the remaining 63 locations. This process continues until all blocks are mapped. For different subbands, different shuffling tables are generated. If block rotation is also employed, the subintervals can each be further subdivided to determine each block's rotation.

Image 1(c) shows the image of 1(a) after the transform coefficients have been block shuffled and inverse transformed. The features of the original frame are virtually unrecognizable. Image 1(d) shows block rotation alone, and image 1(e) shows a combination of sign encryption and block shuffling. Finally, image 1(f) shows the results after a combination of sign encryption, block shuffling, and block rotation. Note that although the scrambled images in 1(c), 1(e), and 1(f) are almost equally incomprehensible, the security levels are different.

For comparison purposes, image 1(g) shows a version of 1(a) after application of a simple scheme where lines of wavelet coefficients are shuffled within each subband. The original image has some vertical structure, which the line shuffling scheme does not render incomprehensible.

The impact of each of these scrambling approaches on the compression efficiency is shown in Table 1. The compression schemes used are state-of-the-art compression schemes—rate-distortion optimized embedded coding (RDE) and layer zero coding (LZC). It can be seen in Table 1 that sign encryption alone introduces no loss of the peak signal-to-noise ratio (PSNR). Block shuffling or block rotation introduce only 0.2–0.4 dB loss from the original PSNR (or equivalently, up to a 5% bit rate increase). Similar amounts of PSNR loss are observed for the combination of these three strategies. On the other hand, the line scrambling scheme introduces up to 1.1 dB loss of the PSNR, or equivalently, a 22% increase in bit rate.

TABLE 1

Impact of different scrambling techniques on compression efficiency for the wavelet transform based system.

| | PSNR (dB) at 0.25 bpp | | | |
|---|---|---|---|---|
| | RDE | | LZC | |
| Scrambling Method | Lena (512 × 512) | Barbara (512 × 512) | Lena (512 × 512) | Barbara (512 × 512) |
| No scrambling | 32.62 | 28.67 | 32.47 | 28.36 |
| Sign encryption | 32.64 | 28.66 | 32.46 | 28.36 |
| Block shuffling | 32.24 | 28.34 | 32.17 | 28.19 |
| Block rotation | 32.35 | 28.32 | 32.26 | 28.24 |
| Line shuffling | 31.90 | 27.54 | 31.79 | 27.46 |
| Sign + Block shuffling | 32.23 | 28.39 | 32.17 | 28.20 |
| Sign + block shuffling + block rotation | 32.27 | 28.24 | 32.16 | 28.18 |

8×8 Block-DCT-Based System

The proposed scrambling methods are integrated into the H.263 verification model coder maintained by the University of British Columbia. In these experiments, the test videos are QCIF size (176×144). For subband shuffling, these experiments treat a row of macroblocks as a slice. Coefficients and motion vectors are shuffled within a slice. In other words, for each subband (frequency location), 44(11×4) coefficients from this band of luminance blocks will be shuffled, and 11 coefficients from this band of each chrominance component will be shuffled. Note that we can also group the 22 coefficients from a particular band of the two chrominance components together and shuffle them, although no results are reported in this section for such a test. The selection of a slice as a unit for shuffling aims to restrict the memory requirement for scrambling.

To reduce the number of shuffling tables, AC coefficients from some bands are grouped together and shuffled using the same shuffling table. In particular, DC coefficients use one shuffling table. The first two AC bands/coefficients in the zigzag order share another shuffling table. Then the next three AC bands in the zigzag order share a shuffling table; then the next four AC bands share a shuffling table, and so on. In the experimental results reported in the following, only the first 45 bands in the zigzag order were shuffled. The other bands were left intact.

A first test tested I frame scrambling. Image 2(a) shows an original I frame from the "carphone" sequence. Image 2(b) shows a corresponding frame after sign bit encryption for the coefficient values and inverse transformation. Although the image is greatly distorted, much of the image is still comprehensible (possibly due to the large contribution of the DC coefficients that retained their correct sign). It is seen that the shuffling along a slice method with/without sign encryption (images 2(c) and 2(d), respectively) renders a completely incomprehensible frame. Also shown in image 2(e) for comparison purposes is the result obtained with the method of Tang where coefficients are shuffled within an 8×8 block. For this particular sequence, with Tang's method the person in the scene remains somewhat discernable due to the uniform darkness of his shirt (shuffling coefficients within blocks will not change the darkness).

Table 2 shows the impact of the scrambling approaches on the compression efficiency for I frames. As expected, sign encryption has no impact on the compression efficiency. Shuffling along slices with/without sign encryption increases the size of the compressed I frame by about 10%. Shuffling within blocks, on the other hand, increases the size of the frame by more than 100%.

TABLE 2

Impact of different scrambling techniques on compression efficiency for one I frame of "carphone" sequence.

| Scrambling Method | Size (bits) | PSNR (dB) |
|---|---|---|
| No scrambling | 17280 | 32.24 |
| Sign encryption | 17280 | 32.24 |
| Shuffle along slice | 18920 | 32.24 |
| Sign + shuffle along slice | 18920 | 32.24 |
| Shuffle within block [Tang] | 36008 | 31.78 |

Table 3 shows the impact of the scrambling approaches on the compressibility of the sequence. Again, the sign encryption has no impact on the compression efficiency. The shuffling along slices method with/without sign encryption, on the average, increases the bit rate of the compressed sequence by about 20%. This suggests that the impact of the shuffling along slices method on compression efficiency is more severe on P frames than on I frames. If both shuffling along slices and sign encryption are used for I frames (and intracoded blocks), but only sign encryption is used for P frames, then the bit rate of the compressed sequence only increases by 1.6%. By way of comparison, Tang's shuffling within blocks method increases the bit rate by about 50%.

TABLE 3

Impact of different scrambling techniques on compression efficiency for 41 frames (one I frame followed by 40 P frames) of "carphone" sequence

| Scrambling Method | Bit rate (kbit/s) | PSNR (dB) (P frames) |
|---|---|---|
| No scrambling | 27.97 | 31.90 |
| Sign encryption | 27.94 | 31.91 |
| Shuffle along slices | 33.51 | 31.90 |
| Sign + shuffle along slices | 33.70 | 31.91 |
| I (sign + slice) + P (sign) | 28.42 | 31.90 |
| Sign + Slice + MV_sign | 34.59 | 31.91 |
| I (sign + slice) + P (sign + MV_sign) | 29.33 | 31.90 |
| Shuffle within block [Tang] | 43.40 | 31.90 |

In our experiments, we found that for all scrambling schemes tested, if motion vector information was not encrypted, then we could perceive that someone was talking in the scene, although the detail was not visible. We believe encryption of motion information may be important for some applications. It is also a very effective way to scramble P/B frames because the reconstructed P/B frames depend heavily on the accuracy of the motion vectors.

Table 3 shows that encrypting the signs of all coefficients and the signs of all motion vectors and only shuffling along slices for I frames/blocks (I(sign+slice)+P(sign+MV_sign)) provides a very good compromise between security and coding efficiency. This method only increases the bit rate by 4.6%, and with the encryption of motion vector signs incorporated, the video sequence is completely indiscernible. Other combinations of the above mentioned scrambling methods are also possible. For example, the method of shuffling motion vectors within a slice can be combined with other coefficient encryption schemes.

The encryption system presented in this disclosure can be used as one component of a complete video transmission or storage system. It is, in principle, independent from other components such as compression and transmission. In some circumstances, performance can be improved by integrating the encrypter with another block of a coder. For example, a context-predictive coder can make use of a shuffling table to determine the context and the coefficient coding order based on the "real" location of blocks, thereby reducing the coding inefficiencies introduced by the edge effects produced by block shuffling. The tradeoff in such a system is flexibility (e.g., transcodability).

One of ordinary skill in the art will recognize that the concepts taught herein can be extended in many other obvious and advantageous ways. Such minor modifications are encompassed within the invention, and are intended to fall within the scope of the claims.

What is claimed is:

1. A method for encrypting a digital image, comprising the steps of:
    applying a space-frequency transform to an original digital image, thereby generating a transform coefficient map corresponding to the digital image; and
    encrypting the transform coefficient map, using one or more encryption techniques selected from the group of techniques consisting of
        scrambling the sign bits of the transform coefficients,
        scrambling the refinement bits of the transform coefficients,
        partitioning the transform coefficient map into a set of two-dimensional coefficient blocks, and shuffling selected blocks within the coefficient map, and
        grouping a set of transform coefficients from a spatial frequency subband, and shuffling the transform coefficients within the group.

2. The method of claim 1, further comprising the step of entropy coding the encrypted transform coefficient map.

3. The method of claim 1, wherein one or more spatial frequency subbands of the original transform coefficient map bypass the encrypting step.

4. A method for encrypting a block of digital data, the method comprising the steps of:
    selecting a group of bits across the block of data, the group having lower than average predicted compressibility as compared to the predicted compressibility of the block of data as a whole; and
    scrambling the group of bits.

5. The method of claim 4, wherein the block of digital data comprises a space-frequency transform coefficient map.

6. The method of claim 5, wherein the group of bits comprises the sign bits from the transform coefficient map.

7. The method of claim 5, wherein the group of bits comprises refinement bits from the transform coefficient map.

8. The method of claim 4, wherein the block of digital data comprises motion-compensation data.

9. A method for encrypting a digital video stream comprising a motion-compensation data component, said method comprising the step of selectively scrambling the motion-compensation data component of the digital video stream prior to bitstream coding of the digital video stream.

10. The method of claim 9, wherein the step of selectively scrambling the motion-compensation data component comprises scrambling the sign bits of the motion-compensation data values.

11. The method of claim 9, wherein the step of selectively scrambling the motion-compensation data component comprises selecting a group of motion vectors and shuffling the vectors within the group.

12. An image encryption system comprising
    an encryption buffer, and
    at least one encryption subsystem operating on transform data stored in the encryption buffer, the encryption subsystem selected from the group of subsystems consisting of:
        a sign bit scrambler that accepts a space-frequency transform coefficient map having signed coefficients, and scrambles the sign bits of the coefficients;
        a block shuffler that accepts a space-frequency transform coefficient map and shuffles two-dimensional coefficient blocks to pseudorandom locations in the map;
        a block rotator that accepts a space-frequency transform coefficient map and rotates two-dimensional coefficient blocks to pseudorandom orientations; and
        a coefficient shuffler that accepts a space-frequency transform coefficient map and shuffles coefficients from a two-dimensional group of coefficients from a spatial frequency subband to pseudorandom locations within the group.

13. The encryption system of claim 12, further comprising an entropy coder that operates on encrypted transform data supplied by the encryption subsystem.

14. The image encryption system of claim 12, wherein the sign bit scrambler operates on a motion vector having signed components.

15. The image encryption system of claim 12, wherein the coefficient shuffler operates on a group of motion vector components.

16. An encrypted-image decryption system comprising
a decryption buffer, and
at least one decryption subsystem operating on encrypted transform data stored in the decryption buffer, the decryption subsystem selected from the group of subsystems consisting of:
  a sign bit descrambler that accepts a space-frequency transform coefficient map and/or a motion vector array having encrypted sign bits, and applies a decryption key to the encrypted sign bits to recreate the original sign bits;
  a block deshuffler that accepts a space-frequency transform coefficient map having shuffled two-dimensional coefficient blocks, and applies a decryption key to the coefficient block pattern to restore the blocks to their original locations;
  a block derotator that accepts a space-frequency transform coefficient map having rotated two-dimensional coefficient blocks, and applies a decryption key to the coefficient block pattern to restore the blocks to their original orientations; and
  a coefficient deshuffler that accepts a space-frequency transform coefficient map having a shuffled two-dimensional group of coefficients from a spatial frequency subband, and applies a decryption key to the coefficient pattern to restore the coefficients in the group to their original locations.

17. The encrypted-image decryption system of claim 16, further comprising an entropy decoder that operates on an input bitstream and supplies encrypted transform data to the decryption buffer.

18. The encrypted-image decryption system of claim 16, wherein the sign bit descrambler operates on a motion vector array having encrypted sign bits.

19. The encrypted-image decryption system of claim 16, wherein the coefficient deshuffler operates on a motion vector array having shuffled motion vector data.

* * * * *